(12) United States Patent
Stander

(10) Patent No.: US 9,831,743 B2
(45) Date of Patent: Nov. 28, 2017

(54) MACHINE WITH TWO CO-AXIAL ROTORS

(71) Applicant: STELLENBOSCH UNIVERSITY, Stellenbosch (ZA)

(72) Inventor: Johan Nico Stander, Stellenbosch (ZA)

(73) Assignee: STELLENBOSCH UNIVERSITY, Stellenbosch, Western Cape Province (ZA)

( * ) Notice: Subject to any disclaimer, the term of this patent is extended or adjusted under 35 U.S.C. 154(b) by 371 days.

(21) Appl. No.: 14/646,881

(22) PCT Filed: Nov. 15, 2013

(86) PCT No.: PCT/IB2013/060160
§ 371 (c)(1),
(2) Date: May 22, 2015

(87) PCT Pub. No.: WO2014/080327
PCT Pub. Date: May 30, 2014

(65) Prior Publication Data
US 2015/0303767 A1    Oct. 22, 2015

(30) Foreign Application Priority Data

Nov. 22, 2012   (ZA) .................................. 2012/08777

(51) Int. Cl.
*H02K 5/16*        (2006.01)
*H02K 7/08*        (2006.01)
(Continued)

(52) U.S. Cl.
CPC .............. *H02K 7/088* (2013.01); *F03D 9/25* (2016.05); *F03D 80/70* (2016.05); *F16C 19/507* (2013.01);
(Continued)

(58) Field of Classification Search
CPC .... H02K 7/088; H02K 5/1672; H02K 5/1732; H02K 16/02; H02K 5/16
(Continued)

(56) References Cited

U.S. PATENT DOCUMENTS 1,687,756 A   10/1928   Foley
3,365,959 A    1/1968   Quermann
(Continued)

FOREIGN PATENT DOCUMENTS

| EP | 1353436 A2 | 10/2003 |
| EP | 2106013 A2 | 9/2009 |
| WO | 2011061491 A2 | 5/2011 |

*Primary Examiner* — Thanh Lam
(74) *Attorney, Agent, or Firm* — Brian C. Trinque; Gordon R. Moriarty; Lathrop Gage LLP

(57) ABSTRACT

A machine having two co-axial and relatively rotatable rotors and a coaxial stator or housing with respect to which both rotors are rotatable is provided wherein two bearing arrangements mutually support the two rotors with respect to each other and with respect to the stator or housing. One of the bearing arrangements comprises multiple support bearings angularly spaced apart with respect to the axis of rotation of the rotors relative to the stator with the support bearings each having an axle or shaft that is fixed relative to one of the rotors or the stator. Each support bearing cooperates with a raceway provided on a concentric adjacent rotor or stator. The machine may be an electromechanical machine such as a wind turbine in which rotational movement of one of the rotors relative to the other and relative to the stator generates electrical energy.

12 Claims, 4 Drawing Sheets

(51) Int. Cl.
*H02K 16/02* (2006.01)
*H02K 7/18* (2006.01)
*F16C 19/50* (2006.01)
*F16C 19/55* (2006.01)
*H02K 1/22* (2006.01)
*F03D 80/70* (2016.01)
*F03D 9/25* (2016.01)

(52) U.S. Cl.
CPC .............. *F16C 19/55* (2013.01); *H02K 1/22* (2013.01); *H02K 5/16* (2013.01); *H02K 7/083* (2013.01); *H02K 7/183* (2013.01); *H02K 7/1838* (2013.01); *H02K 16/02* (2013.01); *H02K 2213/12* (2013.01); *Y02E 10/725* (2013.01)

(58) Field of Classification Search
USPC ................ 310/90, 114, 156.36–156.37, 266; 290/44, 55
See application file for complete search history.

(56) References Cited

U.S. PATENT DOCUMENTS

| | | | |
|---|---|---|---|
| 9,013,081 B2* | 4/2015 | Atallah | H02K 49/102 310/103 |
| 2009/0072645 A1* | 3/2009 | Quere | H02K 7/116 310/114 |
| 2009/0278415 A1* | 11/2009 | Park | H02K 16/00 310/156.08 |
| 2010/0004067 A1 | 1/2010 | Chu | |
| 2010/0308674 A1* | 12/2010 | Kasaoka | H02K 21/14 310/114 |
| 2011/0084563 A1* | 4/2011 | Maier | F16C 32/0442 310/90.5 |
| 2011/0233939 A1 | 9/2011 | Noda | |
| 2014/0008915 A1* | 1/2014 | Ribarov | F03D 1/025 290/55 |

* cited by examiner

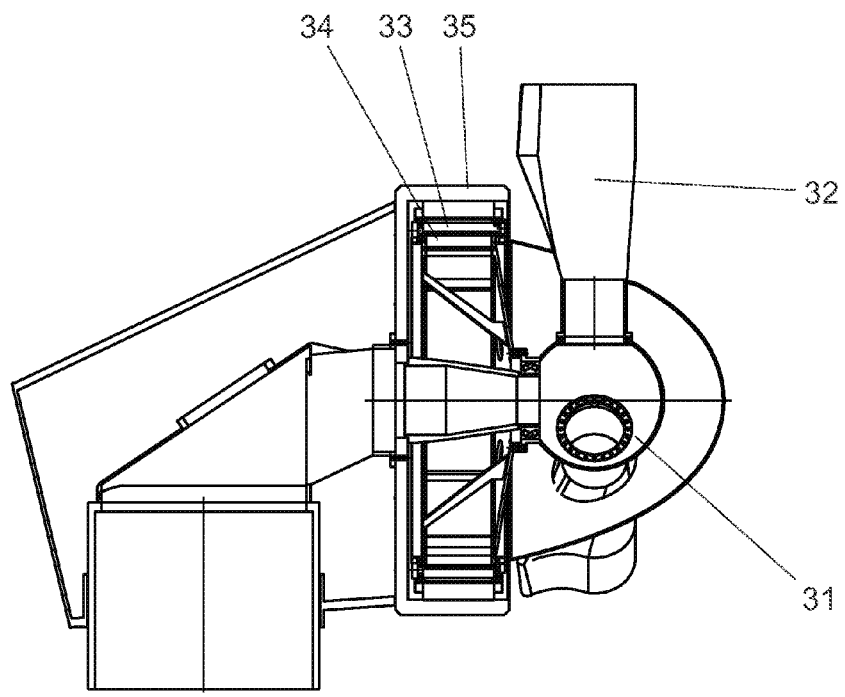
Figure 7
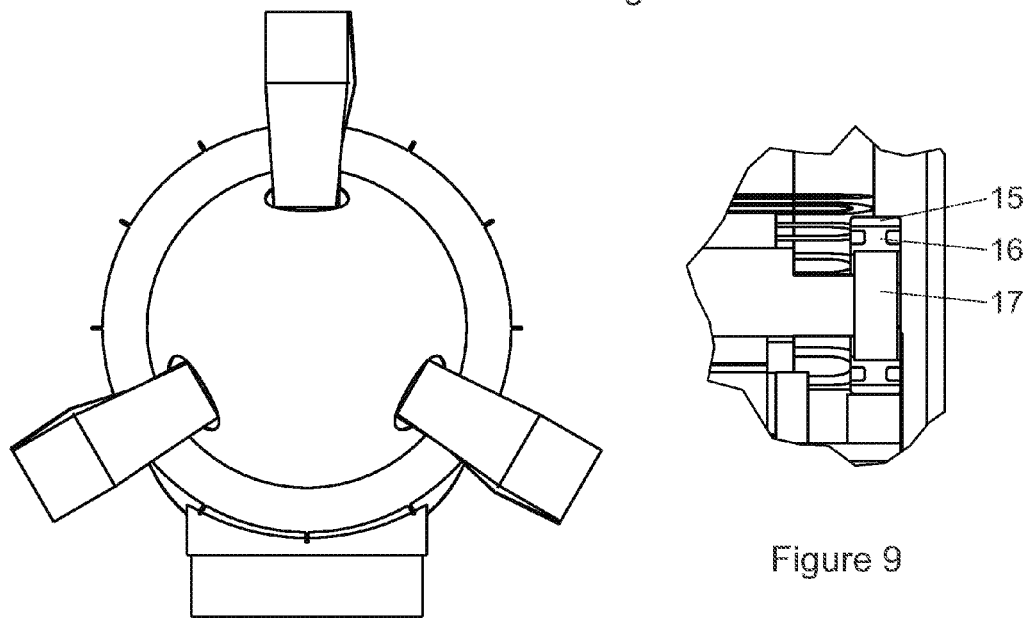
Figure 8
Figure 9

MACHINE WITH TWO CO-AXIAL ROTORS

RELATED APPLICATIONS

This application is a 35 U.S.C. §371 filing of International Application No. PCT/IB2013/060160, filed Nov. 15, 2013, which claims priority to South African Patent Application No. 2012/08777, filed Nov. 22, 2012, each of which is incorporated herein by reference in its entirety.

FIELD OF THE INVENTION

This invention relates to a machine with two coaxial rotors that are rotatable relative to each other and also relative to a stator or housing, a means by which the machine is typically supported, and especially to the mechanical support of a rotor in such a machine.

More particularly, but not exclusively, the invention relates to dual rotor electro-magneto-mechanical machines in which the two rotors are coaxial and are electro-magnetically coupled. Coupling may be by way of either radial or axial flux coupling.

Still more particularly, but not exclusively, the invention relates to a wind turbine that embodies a dual rotor electro-magneto-mechanical machine according to the invention, especially, but not essentially, one in which one of the rotors is a permanent magnet rotor.

BACKGROUND TO THE INVENTION

A major consideration in the design of a mechanical support of a dual rotor machine is the size and therefore the cost of the bearings that support the two rotors relative to each other and relative to a supporting stator or housing. The problem is centred around the size of the bearing and the needed support structure that is necessary for inclusion between two of the rotors or between a rotor and the stator in the larger diameter context of the bearing being radially outwards of an inner bearing used to support the other of the rotors. The very much larger outer bearing is extremely expensive. The same difficulties apply irrespective of the exact nature of the machine that could, for example, be a motor, a generator, or a magnetic gearbox.

Bearing steel is typically the most expensive structural steel in any particular electrical machine. A conventional bearing arrangement includes two sets of large bore bearings that support the two rotors. Bearing bore diameters are limited to about 1200 millimeters and in large machines, this bearing bore limitation translates into large and heavy structures which are needed to reach and support the required rotor diameters apart from being highly costly.

Internally excited permanent magnet induction generators are known and function on the principle of having an additional, freely rotating permanent magnet rotor in combination with a normal induction rotor. The permanent magnet induction generator is generally positioned between the induction rotor and the stator. The permanent magnet rotor provides flux within the machine which alleviates the need for a magnetizing current and which, in turn, results in an improved power factor for the machine as a whole.

Most commercially available wind energy conversion systems currently utilize a combination of complex gearboxes and high speed induction machines. These systems are generally directly connected to an electricity grid, which is made possible by the induction machine being capable of slipping, thus allowing for a soft grid connection. Gearboxes and power converters used in conventional wind energy conversion systems are respectively mechanically and electronically expensive, maintenance intensive items of equipment which increase the overall cost of setting up and operating such a system. Gearboxes also contribute substantially to overall system mass and losses due to, for example, heat and noise. Power converters, on the other hand, are complex and expensive, electrically sensitive systems.

Applicant perceives a need for a machine having two coaxial rotors and a stator that can be used in many different applications.

SUMMARY OF THE INVENTION

In accordance with this invention there is provided a machine having two coaxial and relatively rotatable rotors and a coaxial stator or housing with respect to which both rotors are rotatable and wherein two bearing arrangements mutually support the two rotors with respect to each other and with respect to the stator or housing wherein one of the bearing arrangements comprises multiple support bearings angularly spaced apart with respect to the axis of rotation of the rotors relative to the stator with the support bearings each having an axle or shaft that is fixed relative to one of the rotors or the stator with each support bearing cooperating with a raceway provided on a concentric adjacent rotor or stator wherein a diameter of the raceway and angular arrangement of the support bearings is greater than the diameter of the other of the bearing arrangements.

Further features of the invention provide for the support bearings to each comprise an outer roller liner carried by a bearing body that in turn is carried by a bearing on the inside thereof; for the bearing associated with each of the support bearings to be a roller or a journal bearing; for the support bearings to each have a body supported either on an axle fixed relative to the rotor or stator or on a shaft rotatable relative to the rotor or stator; for the other of the bearing arrangements to be a conventional bearing coaxial with the axis of rotation of the rotors; for the machine to be an electromechanical machine in which rotational movement of one of the rotors relative to the other and relative to the stator generates electrical energy; for the one rotor to be an induction rotor, typically driven for example by a wind turbine, with the other rotor being a freely rotating rotor, typically having permanent magnets associated therewith so as to form a so-called split permanent magnet generator; for the two rotors and stator to be arranged one within the other to create radial flux coupling, in use, or, in the alternative, for the two rotors and the stator to be located immediately adjacent to each in the axial direction in order to create axial flux coupling; for the support bearings to be arranged to define, in cooperation with the raceway, an air gap between the two rotors or between a rotor and the stator as the case may be; and for the stator to be either inside the two rotors or on the outside of the two rotors, according to design requirements.

The invention also provides a wind turbine that embodies a machine in the form of an electrical generator as defined above.

In order that the invention may be more fully understood different embodiments thereof will now be described with reference to the accompanying drawings.

BRIEF DESCRIPTION OF THE DRAWINGS

In the drawings:

FIG. 7 is a schematic sectional side elevation of the general arrangement illustrated in FIGS. 1 to 3 as applied to a wind turbine;

FIG. 8 is a schematic front elevation thereof;

FIG. 9 is a more detailed section showing the construction of a support roller therein;

DETAILED DESCRIPTION WITH REFERENCE TO THE DRAWINGS

Figure 1:
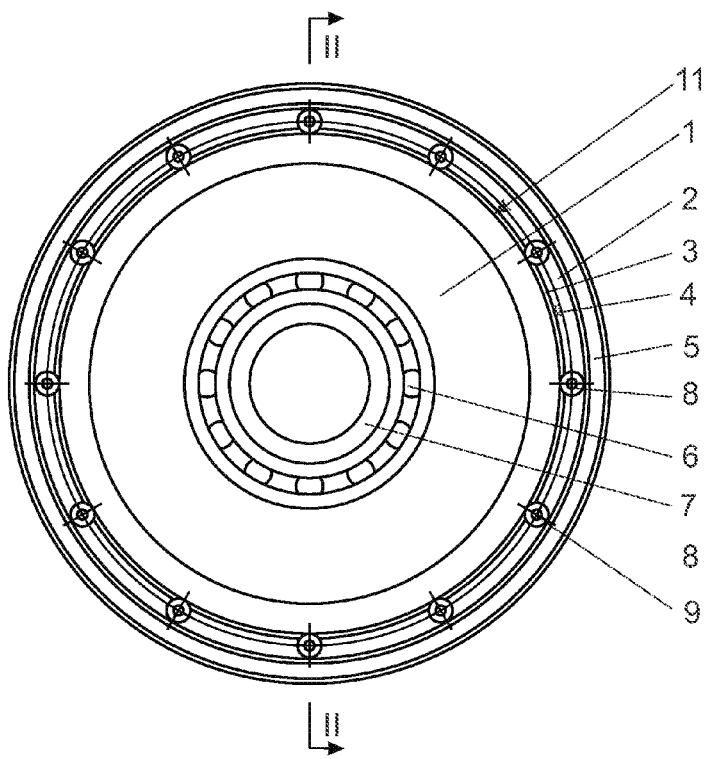
FIG. 1 is a schematic elevation of an embodiment of the invention in which the stator is on the outside of the two rotors.
Figure 2:
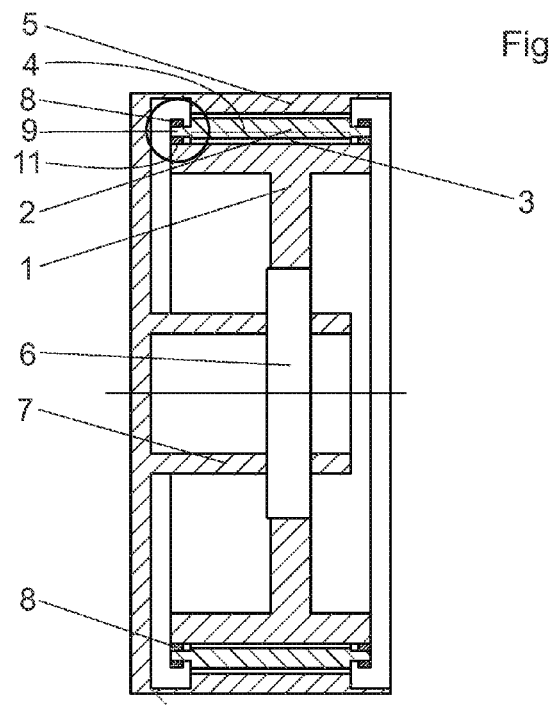
FIG. 2 is a sectional side elevation taken along line II-II in FIG. 1.
Figure 3:
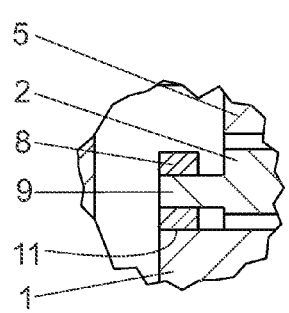
FIG. 3 is an enlarged section showing the arrangement of a support roller in more detail.

Referring firstly to the embodiment of the invention illustrated in FIGS. 1 to 3 of the drawings, a machine according to the invention is in the form of a split permanent magnet generator having an inner rotor (1) in the form of an induction rotor and a freely rotatable rotor (2) surrounding it with an air gap (3) between the two rotors. The freely rotatable rotor has a segmented construction with permanent magnets (4) associated therewith so as to form, with the surrounding stator (5) and the induction rotor (1), the split permanent magnet generator. The two rotors and stator are thus arranged one within the other to create a radial flux coupling and the rotors are rotatable with respect to each other and with respect to the stator as will become more apparent from the following.

As may be appropriate, each of the rotors and stator may be made up of a series of laminates together with appropriate windings, as the case may be, in the usual way and their detailed construction is not further discussed herein as it is not of any relevance to the present invention.

In this embodiment of the invention the induction rotor (1) is carried through a conventional type of bearing (6) by a tubular central support (7) that is fixed relative to the stator.

However, as provided by this invention, the freely rotatable permanent magnet rotor (2) is carried by two axially spaced sets of multiple support rollers (8) that are angularly spaced about the periphery of the induction rotor relative to the common axis of rotation of the rotors. Each of the support rollers is carried on an axle or is fixed to a shaft (9) that is fixed relative to the permanent magnet rotor (2).

The angular spacing of the support rollers in this embodiment of the invention is selected to be 30° but any other appropriate angular spacing could be employed as design detail may require, and especially according to the diameter of the circular array of support rollers; the size and specifications and adjustability of the support rollers themselves; and the desired air gap between the relatively rotatable rotors and the rotor and stator. Such an air gap is typically of the order of 5 mm.

Radial and axial loading conditions will generally determine the bearing and roller selection. The roller size may depend on the air-gap requirement which is the clearance between the two rotating rotors. Rollers may be a combination of different materials layered to specific stress requirements. Roller interface with the raceways may be accomplished in various topologies, for example, a roller design with V-grooves.

The two side edges (11) of the induction rotor are formed into segmented raceways on which the outer periphery of the support rollers rides in this embodiment of the invention.

The bearing arrangements are thus composed of relatively simple and inexpensive bearings when compared to a large diameter bearing. The diameter of the raceway and angular arrangement of the support rollers, on the other hand, is substantially greater than the diameter of the conventional bearing (6).

It is to be mentioned that, as shown in FIG. 9, each of the support rollers may comprise an outer roller liner (15) carried by a roller body (16) that in turn is carried by a roller bearing (17) on the inside thereof.

Figure 4:
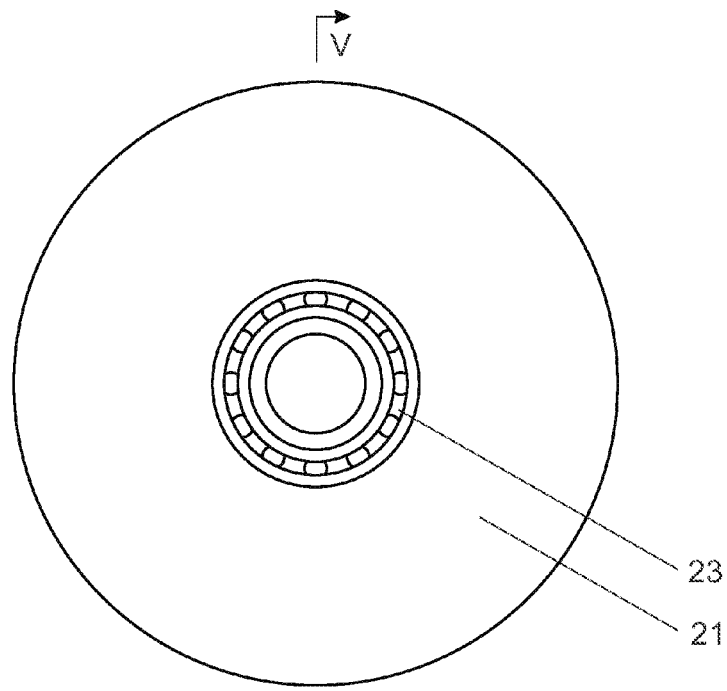
FIG. 4 is a schematic elevation of an embodiment of the invention in which the stator is on the inside of the two rotors.
Figure 5:
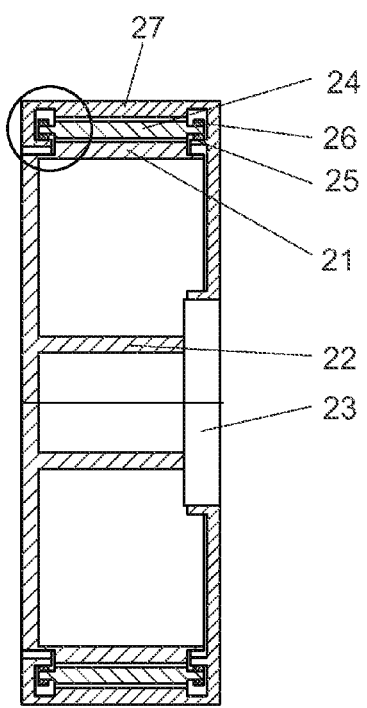
FIG. 5 is a sectional side elevation taken along line V-V in FIG. 4.
Figure 6:
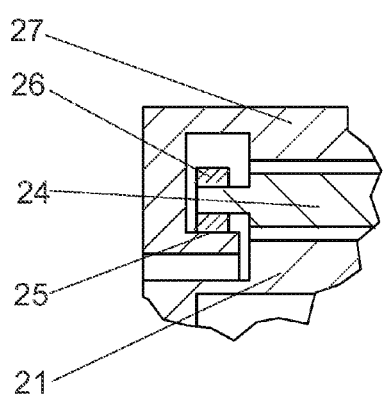
FIG. 6 is an enlarged section showing the arrangement of the support roller illustrated in FIG. 5 in more detail.

Of course, it is within the scope of this invention that the stator be located on the inside of the rotors and such an arrangement is illustrated in FIGS. 4 to 6 of the drawings. In this instance the induction rotor (21) may be carried on a central tubular support (22) by way of a conventional bearing (23) with the permanent magnet rotor (24) being carried on a raceway (25) formed integral with the induction rotor by way of multiple rollers (26). The stator (27), in this embodiment of the invention, is on the inside of the rotors.

Referring now to FIGS. 7 to 9 of the drawings, one application of an embodiment of the invention as illustrated in FIGS. 1 to 3 would be to a wind turbine. In this instance the wind turbine has a hub (31) from which the blades (32) extend radially and the hub is connected to drive the inner induction rotor (33) with the permanent magnet rotor (34) being located in between the induction rotor and the stator (35) as described with reference to FIGS. 1 to 3. The wind turbine could be of the general type described in our co-pending published patent application number WO 2012/017302.

Figure 10:
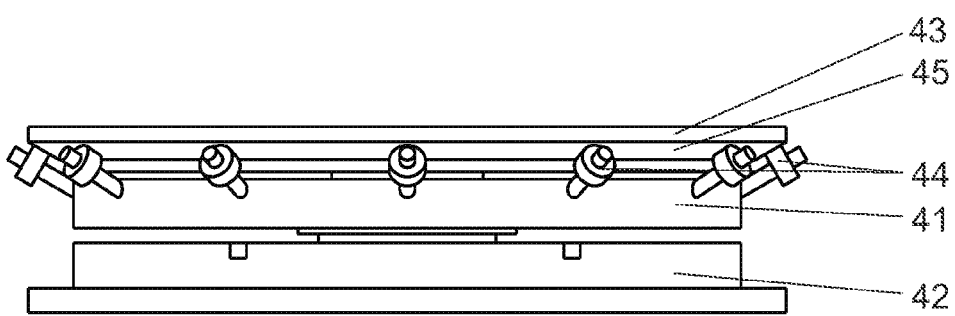
FIG. 10 is a schematic side elevation of an embodiment of the invention in which the two rotors and the stator are arranged for axial flux coupling between them; and, FIG. 11 is a schematic sectional side view of the embodiment of the invention illustrated in FIG. 10.
Figure 11:
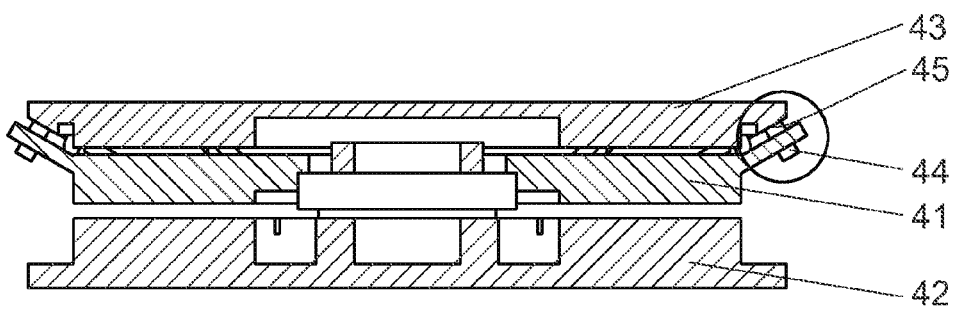

Referring now to FIGS. 10 and 11, the principles of the invention can also be applied to a machine in which there is axial flux coupling. In such an arrangement a generally horizontal first rotor (41) can be mounted rotatably relative to an axially adjacent stator (42) with the axially adjacent second rotor (43) being supported by the first rotor by way of an array of rollers (44). The rollers are illustrated as being inclined so as to cooperate with an inclined raceway (45) on the second rotor which can have the effect of centralizing the second rotor relative to the first. In this arrangement a single set of support rollers may be employed in the arrangement described.

Application of the invention results in the utilization of smaller parts with accompanying improved maintainability. Use of the invention may be used to employ point of loading in order to minimize structural stiffness requirements hence structural material needs. The bearing support rollers may improve air-gap clearance management with a smaller air-gap deflection. The invention when applied to segmented rotor designs may yield reduced component size and thus also reduced shipping and maintenance time and cost. Smaller components or assemblies may also lead to cheaper machine manufacturing and the use of standard components.

It will be understood that numerous variations may be made to the embodiments of the invention described above without departing from the scope hereof.

The invention claimed is:

1. A machine having two co-axial and relatively rotatable rotors and a coaxial stator or housing with respect to which both rotors are rotatable and wherein two bearing arrangements mutually support the two rotors with respect to each other and with respect to the stator or housing wherein one of the bearing arrangements comprises multiple support bearings angularly spaced apart with respect to the axis of rotation of the rotors relative to the stator with the support bearings each having an axle or shaft that is fixed relative to one of the rotors or the stator with each support bearing cooperating with a raceway provided on a concentric adjacent rotor or stator wherein a diameter of the raceway and angular arrangement of the support bearings is greater than the diameter of the other of the bearing arrangements.

2. A machine as claimed in claim 1 in which the support bearings each comprise an outer roller liner carried by a bearing body that in turn is carried by a bearing on the inside thereof.

3. A machine as claimed in claim 1 in which the bearing associated with each of the support bearings is a roller or a journal bearing.

4. A machine as claimed in claim 1 in which the support bearings each have a body supported either on an axle fixed relative to the rotor or stator or on a shaft rotatable relative to the rotor or stator.

5. A machine as claimed in claim 1 in which the other of the bearing arrangements is a conventional bearing coaxial with the axis of rotation of the rotors.

6. A machine as claimed in claim 1 in which the machine is an electromechanical machine in which rotational movement of one of the rotors relative to the other and relative to the stator generates electrical energy.

7. A machine as claimed in claim 1 in which the one rotor is an induction rotor driven by a wind turbine, with the other rotor being a freely rotating rotor having permanent magnets associated therewith so as to form a so-called split permanent magnet generator.

8. A machine as claimed in claim 1 in which the two rotors and stator are arranged one within the other to create radial flux coupling, in use.

9. A machine as claimed in claim 1 in which the two rotors and the stator are located immediately adjacent to each in the axial direction in order to create axial flux coupling.

10. A machine as claimed in claim 1 in which the support bearings are arranged to define, in cooperation with the raceway, an air gap between the two rotors or between a rotor and the stator as the case may be.

11. A machine as claimed in claim 1 in which the stator is either inside the two rotors or on the outside of the two rotors.

12. A wind turbine that embodies a machine as claimed in claim 1 in which the machine is in the form of an electrical generator.

* * * * *